NON-DESTRUCTIVE READOUT MAGNETIC MEMORY

Filed Aug. 19, 1963 3 Sheets-Sheet 1

INVENTOR
ROBERT F. ELFANT
BY Stephen J. Limanek
ATTORNEY

Dec. 20, 1966 R. F. ELFANT 3,293,624

NON-DESTRUCTIVE READOUT MAGNETIC MEMORY

Filed Aug. 19, 1963 3 Sheets-Sheet 3

3,293,624
NON-DESTRUCTIVE READOUT MAGNETIC MEMORY

Robert F. Elfant, Yorktown Heights, N.Y., assignor to International Business Machines Corporation, New York, N.Y., a corporation of New York Filed Aug. 19, 1963, Ser. No. 302,814
10 Claims. (Cl. 340—174)

Figures 1A, 1B, 2, 3:
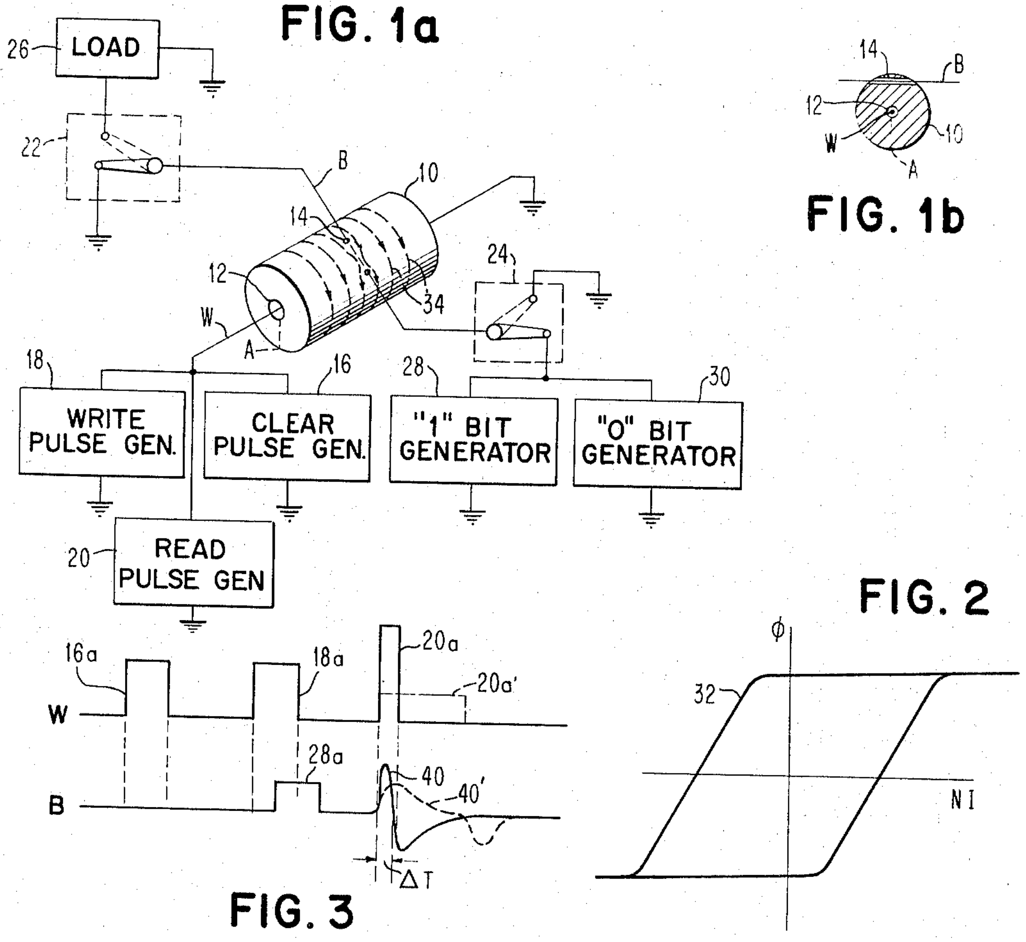

This invention relates to magnetic storage devices and more particularly to non-destructive readout memory systems amenable to mass fabrication techniques.

In a known memory system amenable to mass fabrication techniques, a magnetic tubular element having a relatively high degree of remanence is threaded in a first direction through a first hole or aperture by a first conductor and in a second direction transverse to the first direction through a second hole or aperture by a second conductor. This structure, when provided with a plurality of second conductors passing through a corresponding plurality of parallelly arranged holes, resembles somewhat a flute, and, therefore, this memory system is commonly referred to as a flute memory. A current pulse of a given polarity is passed through the first conductor to provide a saturating magnetic field in the magnetic element circumferentially about the first conductor without producing a flux linkage with the second conductor. In this condition of the magnetic element of the memory a "0" bit is said to be stored therein. In order to store a "1" bit in the magnetic element, a current pulse of either negative or positive polarity is passed through the second conductor providing a second magnetic field which is perpendicular to the saturating field produced by the current pulse passed through the first conductor. The relationship of current pulses in the first and second conductors is such that the saturating and second magnetic fields are produced concurrently but with the second field terminating after the termination of the saturating field. By utilizing such a pulse program, a flux linkage is produced with the second conductor to provide the "1" bit condition in the magnetic element. This memory system is read out or interrogated destructively by passing a current pulse of the given polarity or of a polarity opposite to that of the given polarity through the first conductor and sensing with the second conductor. If the magnetic element of the memory was in a "0" bit condition, an output voltage is not produced in the second conductor since there was no flux linkage with the second conductor when the "0" bit was stored and there is no flux linkage with the second conductor when the interrogating current pulse is passed through the first conductor orthogonally arranged with respect to the second conductor. If the magnetic memory was in a "1" bit condition, an output voltage is produced in the second conductor since there was flux linkage with the second conductor which is destroyed by the interrogating current pulse. Accordingly, it can be seen that after reading out the "0" bit or the "1" bit the magnetic element of the memory contains a circumberential field about the first conductor without a flux linkage of the second conductor. The latter condition is referred to as the clear condition of the memory which, of course, destroys the information previously stored therein. For a more detailed reference of the magnetic memory described hereinabove reference may be had to commonly assigned applications Serial No. 206,356, filed by R. F. Elfant and K. R. Grebe, and Serial No. 250,908, filed by R. F. Elfant and N. J. Mazzeo.

It is well known that the versatility of memories is greatly enhanced when the read out of stored information is non-destructive as compared to destructive type read out. In the destructuve read out memories, a memory cycle generally involves two phases. During the first phase the information is read from a particular location and during the second phase this same information or different information is stored in the particular memory location. It is also known that information can be read from a non-destructive read magnetic memory much faster than can be read and re-written from destructive read magnetic memories and that the energy requirements are less for the non-destructive read magnetic memories.

An object of this invention is to provide a magnetic memory of the flute type which is read out non-destructively.

It is another object of this invention to provide a non-destructive read out magnetic memory of the flute type type producing bipolar output pulses.

It is a further object of this invention to provide a non-destructive read out magnetic memory of the flute producing bipolar output pulses.

It is still another object of this invention to provide an improved flute type magnetic memory which reads at a faster rate and requires less energy than do the prior flute type magnetic memories.

In accordance with the present invention a non-destructive read out magnetic memory system of the flute type is provided which includes means for varying the orthogonal component of the flux with respect to the conductor used to provide the second field transverse to the saturating field while maintaining a flux linkage with that conductor. The orthogonal flux component may be varied by passing through the conductor used to provide the saturating field a read pulse of a polarity similar or oposite to that used to clear the magnetic element of the memory but of an energy content less than that of the clear pulse.

An important advantage of the present invention is that a flute type memory is provided which operates at faster speeds than did the prior flute memories.

An important feature of the present invention is that a flute type memory is provided which includes less circuitry and costs less than do prior flute memories.

The foregoing and other objects, features and advantages of the invention will be apparent from the following more particular description of the preferred embodiments of the invention, as illustrated in the accompanying drawings.

Figure 4A:
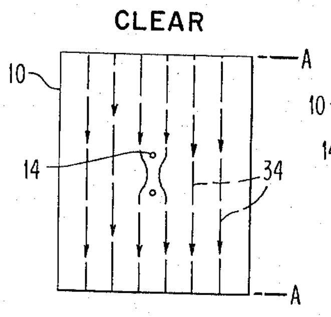
Figure 4B:
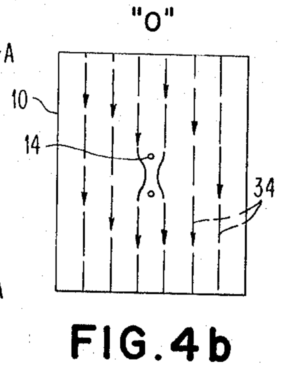
Figure 4C:
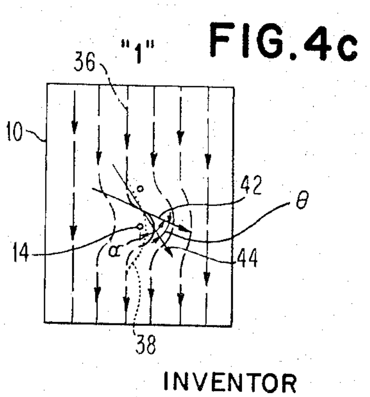
Figure 5:
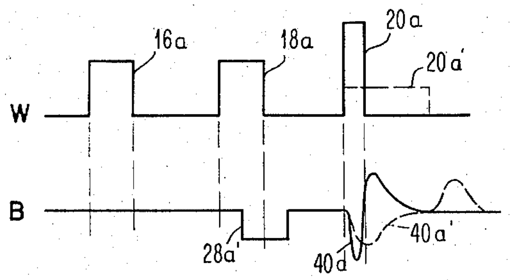
Figure 6A:
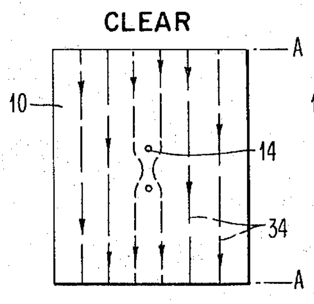
Figure 6B:
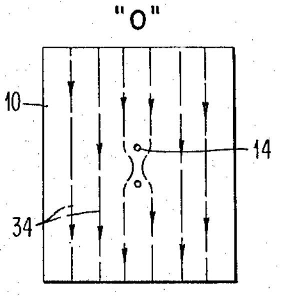
Figure 6C:
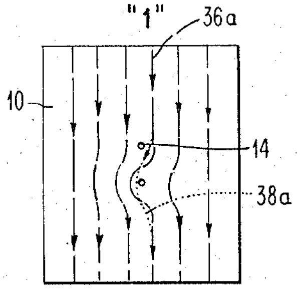
Figure 7:
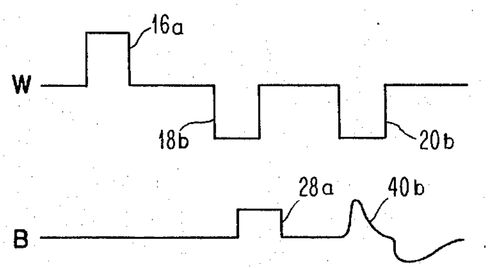
Figure 8A:
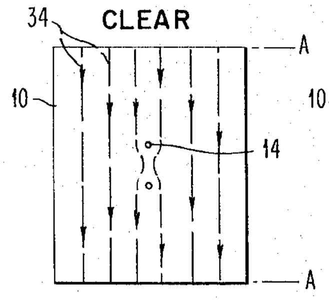
Figure 8B:
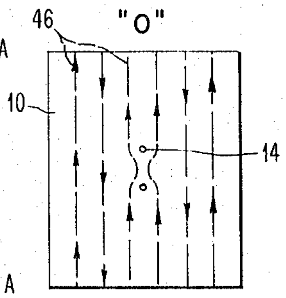
Figure 8C:
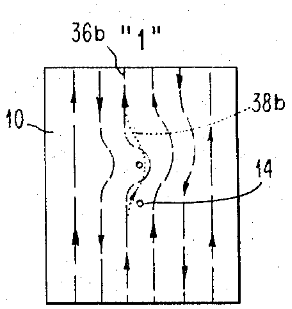
Figure 9:
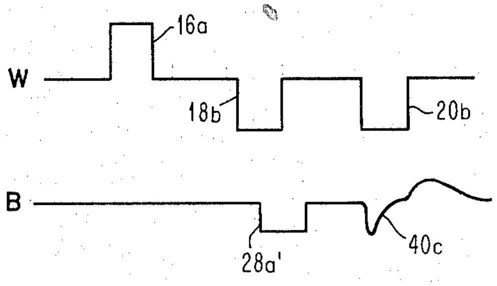
Figure 10A:
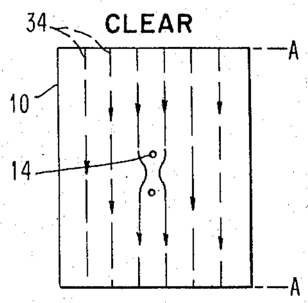
Figure 10B:
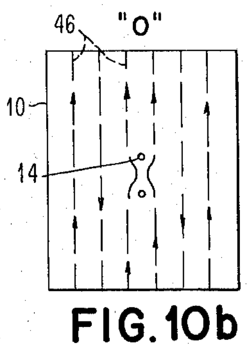
Figure 10C:
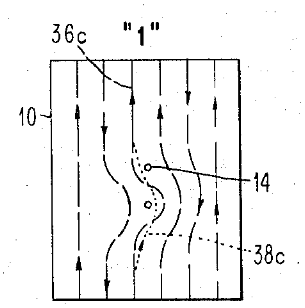
Figure 11:
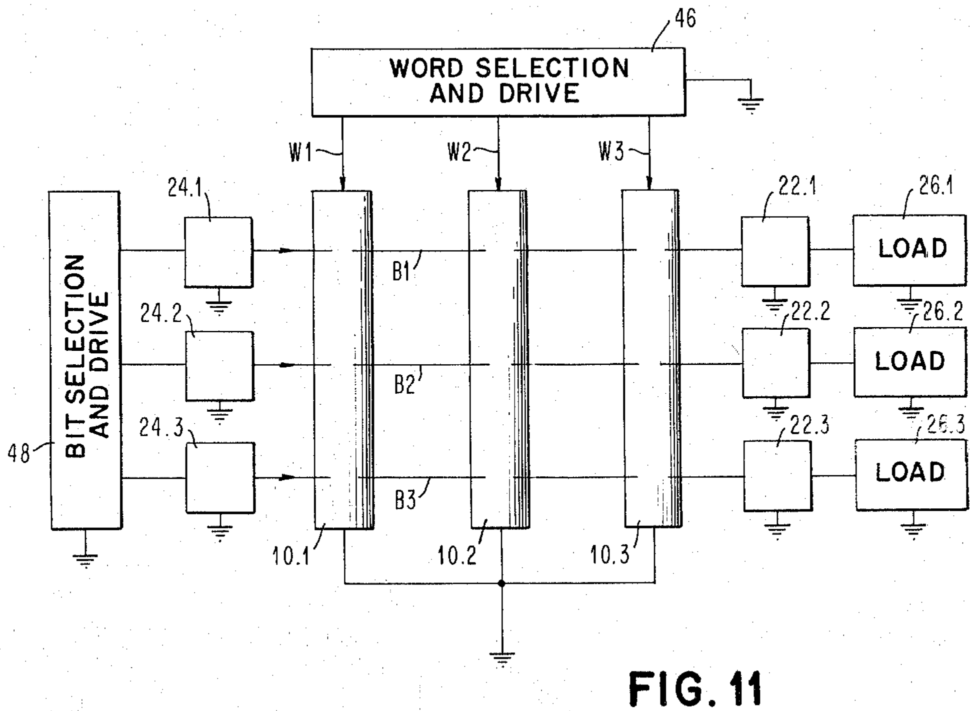

In the drawings,

FIG. 1*a* illustrates an embodiment of the magnetic memory system of the present invention, FIG. 1*b* illustrates a transverse cross-section of the magnetic element of the system shown in FIG. 1*a*, FIG. 2 is a plot of flux $\phi$ versus applied field NI for magnetic element material which may be used in the system shown in FIG. 1*a*, FIG. 3 is an illustration of a first pulse program which may be employed to operate the system of FIG. 1*a* in accordance with the teachings of the present invention, FIGS. 4*a*, 4*b* and 4*c* are developed views of the magnetic element of the system shown in FIGS 1*a* and 1*b*, opened along line A as indicated in FIGS. 1*a* and 1*b*, illustrating flux distribution therein produced by the first pulse program of FIG. 3, FIG. 5 is an illustration of a second pulse program which may be employed to operate the system of FIG. 1*a* in accordance with the present invention, FIGS. 6*a*, 6*b* and 6*c* are developed views of the magnetic element of the system shown in FIGS. 1*a* and 1*b* illustrating flux distribution therein produced by the second pulse program of FIG. 5, FIG. 7 is an illustration of a third pulse program which may be employed to operate the system of FIG. 1 in accordance with the present invention, FIGS. 8*a*, 8*b* and 8*c* are developed views of the magnetic element of the system shown in FIGS. 1*a* and 1*b* illustrating flux distribution therein produced by the third pulse program of FIG. 7, FIG. 9 is an illustration of a fourth pulse program which may be employed to operate the system of FIG. 1*a* in accordance with the present invention, FIGS. 10*a*, 10*b* and 10*c* are developed views of the magnetic element of the system shown in FIGS. 1*a* and 1*b* illustrating flux distribution therein produced by the fourth pulse program of FIG. 9, and FIG. 11 is a magnetic memory according to another embodiment of this invention.

Referring to the drawings in more detail there is shown in FIG. 1*a* an embodiment of the flute type magnetic memory system of the present invention which includes a first conductor W passing through a magnetic element 10 in a first hole 12 and a second conductor B disposed in orthogonal relationship with respect to the first conductor W, but displaced therefrom, also passing through the magnetic element 10 in a second hole 14 therof. The magnetic element 10 is illustrated in a cylindrical form but other forms such as block or bar are also adaptable for use. The first conductor W and the second conductor B may be separated from one another in a range of distances. However, the distance should be such that when both of the conductors are energized the magnetic fields produced by each are combined at least in part to produce a resultant field linking both conductors W and B. The first conductor W is connected at one end to ground and at the other end to a clear pulse generator 16, a write pulse generator 18 and a read pulse generator 20. The second conductor B is connected at one end to a first switching means 22 and at the other end to a second switching means 24. The first switching means 22 is operative to connect the one end of conductor B either to ground or to a load 26, while the second switching means 24 is operative to connect the other end of conductor B to ground or to a "1" bit generator 28 and a "0" bit generator 30. The first and second switching means 22 and 24 are preferably ganged so that when the one end of conductor B is connected to ground by the first switching means 22, the other end of conductor B is connected by the second switching means 24 to the bit generators 28 and 30 and, when the one end of conductor B is connected by the first switching means 22 to the load 26, the other end of conductor B is connected by the second switching means 24 to ground. In FIG. 1*b* of the drawing, there is shown a cross-section of the magnetic element 10 taken through the second hole 14 thereof to more clearly illustrate the relationship between the first and second conductors W and B.

The material of the magnetic element 10 may be made of any type of magnetic material which exhibits remanence. Accordingly, it is not necessary that the magnetic material employed in element 10 be of the type which exhibits a rectangular loop characteristic. However, it should be understood that magnetic material of the rectangular loop may also be used as material for the magnetic element 10. In FIG. 2 of the drawing, there is shown a curve 32 which is a plot of flux $\phi$ versus applied field NI for magnetic material which provides satisfactory operation of the system illustrated in FIGS. 1*a* and 1*b*. The hysteresis loop defined by the curve 32 is a 60-cycle hysteresis loop operated by alternately saturating the material of the magnetic element 10 circumferentially with respect to the first conductor W by applied magnetic fields and obtaining a trace on an oscilloscope connected to a standard interrogating circuit and a conductor having a similar relationship to the material of the magnetic element 10 as the first conductor W. Since the second conductor B is a right-angle relationship with conductor W, the second conductor B cannot be utilized to obtain the traces for the curve 32 when current is passed through the first conductor W to establish the magnetic fields.

In order to explain the operation of the non-destructive read out memory system of the present invention, reference will be made to the pulse program illustrated in FIG. 3 wherein pulses passing through the magnetic element 10 on the first conductor W are indicated as W pulses in FIG. 3 and the pulses produced in the second conductor B are indicated as B pulses. As with most memory systems, before information is written into the system the system is first cleared of all previously stored information. In the present memory system, the system is cleared by applying a pulse **16*a* shown in FIG. 3 from the clear pulse generator 16** of the system of FIG. 1*a*. The magnitude of the pulse **16*a* is such that a substantially saturating magnetic field is applied to the magnetic element 10. The remanent flux pattern produced by the clear pulse 16*a*** is indicated in FIG. 1*a* in the magnetic element 10 by lines 34 and also in FIG. 4*a* which is a developed view of magnetic element 10 broken away at line A as indicated in FIGS. 1*a* and 1*b*. In order to write a "0" bit into the magnetic element 10, a pulse **18*a* is subsequently applied to the first conductor W by write pulse generator 18. Since the "0" bit pulse 18*a* is similar to the clear pulse 16*a*, the pulse pattern produced by the pulse 18*a* is similar to that produced by the clear pulse 16*a*, as indicated in the developed view of the magnetic element 10** in FIG. 4*b*. When a "1" bit is to be written into the magnetic element 10, a write pulse **18*a* from the write pulse generator 18 is applied to the first conductor W and concurrently therewith for at least a portion thereof a pulse 28*a* is applied to the second conductor B from the "1" bit generator 28. The duration of the pulse 28*a* is such that it is terminated after the termination of the write pulse 18*a* produced by the write pulse generator 18. The magnitude of the pulse 28*a* is substantially less than the magnitude of the pulse 18*a* since the pulse 28*a* should not produce a saturation field in the magnetic element 10 and since all that is required of the field produced by the pulse 28*a* is to initiate a uniform direction of stability to the domains of the portion of material of the magnetic element 10 above the second hole 14. The magnitude of this field must be controlled so that in the absence of the saturating field produced by the write pulse 18*a* an erroneous remanent flux orientation is not created about the second conductor B. The importance of the magnitude of this field will become apparent after the embodiment of the invention illustrated in FIG. 11 has been described. The flux pattern produced by the pulses 18*a* and 28*a* to write a "1" bit into the magnetic element 10** is indicated in FIG. 4*c*. It can be seen that the two pulses **18*a* and 28*a* produce a resultant flux indicated by line 36 in the area of the magnetic element 10 common to the fluxes produced by the pulses 18*a* and 28*a* which links both the first conductor W and the second conductor B. By following the path of the resultant flux 36** as indicated in FIG. 4*c*, it can be seen that the flux 36 passes over the conductor B, which is threaded through the hole 14 as shown in FIG. 1*a* from one side thereof to the other between the ends of the hole 14 and then completes its path by surrounding the first conductor W. In order to detect this "1" bit condition in the magnetic element 10, a read pulse **20*a* is applied to the first conductor W by the read pulse generator 20. The read pulse generator 20 is designed so as to produce a pulse of the same polarity as that of the clear pulse 16*a* and the write pulse 18*a* but of a lower energy content. Thus, the magnitude of the pulse 20*a* may exceed that of the write and clear pulses 16*a* and 18*a*, or its duration may exceed that of the clear and write pulses 16*a* and 18*a* as indicated by the pulse 20*a'*. The read pulse 20*a* is preferred to the read pulse 20*a'* since it produces a sharper output voltage, however, read pulse 20***a* is more difficult to obtain than is the read pulse 20*a'*. When the read pulse 20*a* or 20*a'* is applied to the first conductor W, the field produced by this pulse tends to alter the flux pattern shown in FIG. 4*c* in the direction of the clear flux pattern illustrated in FIG. 4*a*. Since the energy content of the read pulse 20*a* or 20*a'* is less than that of the clear pulse 16*a*, the resultant flux 36 will be varied only to form a pattern somewhat as indicated by dotted line 38. It can be seen that the flux indicated by line 38 continues to link the second conductor B. Accordingly, in order to prevent the destruction of the stored "1" the energy content of the read pulse 20*a* must be less than that which will destroy the link between the conductor B and the resultant flux 36. After the termination of the read pulse 20*a* or 20*a'* the flux pattern will be restored to that indicated by line 36. The output voltage produced by the read pulse 20*a* or 20*a'* is indicated in FIG. 3 at 40 or 40', depending upon whether read pulse 20*a* or 20*a'* was used. This output voltage 40 or 40' is detected in the second conductor B which during the read out time is connected by the first and second switches 22 and 24 to the load 26. The magnitude of the output voltage 40 or 40' is dependent upon the angle $\theta$ indicated in FIG. 4*c* which is determined by the slope 42 of the resultant flux curve 36 and the slope 44 of the flux curve 38 at the point whereas the curves 36 and 38 pass between the ends of the second hole 14. The magnitude of the output voltage 40 or 40' may be calculated by the formula:

$$e=2\phi_R\frac{\sin\alpha-\sin(\alpha-\theta)}{\Delta T}$$

where $\phi_R$ is the flux indicated by vectors 42 and 44 and $\alpha$ and $\theta$ are the angles indicated in FIG. 4*c* of the drawing and $\Delta T$ is the time duration of the initial polarity of the output signal as indicated in FIG. 3 of the drawing.

The first pulse program illustrated in FIG. 3 of the drawing includes a positive voltage 28*a* produced by the "1" bit generator 28 of FIG. 1*a*. It should be understood that although the polarity of the voltage from the "1" bit generator was the same as the polarity of the write pulse 18*a* from the write pulse generator it is possible to operate the system of the present invention with a pulse from "1" bit generator 28 of an opposite polarity to that of the polarity of the write pulse 18*a* from the write pulse generator 18. Accordingly, there is shown in FIG. 5 a pulse program which is similar to the pulse program illustrated in FIG. 3 but which includes a negative pulse 28*a'* applied to the second conductor B from the "1" bit generator 28. It can be seen that the relationship between the negative pulse 28*a'* and the write pulse 18*a* of FIG. 5 is similar to that between the positive pulse 28*a* and the positive pulse 18*a* of the first pulse program of FIG. 3. Furthermore, the absolute magnitude of the pulse 28*a'* is similar to that of the pulse 28*a*. The flux pattern produced by the second pulse program illustrated in FIG. 5 is indicated in FIGS. 6*a*, 6*b* and 6*c*. It can be seen that the flux pattern in FIG. 6*a* produced by the clear pulse 16*a* is similar to the flux pattern illustrated in FIG. 4*a* and that the flux pattern illustrated in FIG. 6*b* for the "0" bit is similar to the flux pattern illustrated in FIG. 4*b*. However, due to the change in polarity of the pulse 28*a'* in FIG. 5 from that of the pulse 28*a* in FIG. 3, a resultant flux produced by the pulses 18*a* and 28*a'* links the second conductor B in a pattern which differs from that produced by the resultant flux 36 of FIG. 4*c* as indicated at 36*a* in FIG. 6*c*. When the magnetic element 10 is to be read out non-destructively by the pulse 20*a* or 20*a'*, the pattern of the flux linking the second conductor B is varied as indicated by the dotted line 38*a*. Since this pulse program also produces a change in the orthogonal component of the flux relative to the second conductor B, an output voltage is produced which is indicated at 40*a* or 40*a'* of FIG. 5. The phase of the output pulse produced on the second conductor B is now the reverse of that produced in conductor B by the first pulse program of FIG. 3 since the direction of the flux linkage about the second conductor B is reverse compared to the direction of flux linkage produced by the pulse program of FIG. 3.

It can be readily seen that the system of the present invention may produce a bipolar output pulse by applying to the second conductor B a pulse of one polarity from the "1" bit generator 28 to write a "1" bit in the magnetic element 10 and to apply to the second conductor B a pulse of an opposite polarity from the "0" bit generator 30. An advantage of the bipolar output signal is an improvement in discrimination and a reduction in the requirements of the load circuit.

In FIG. 7 there is illustrated a third pulse program which may be used in accordance with the teachings of the present invention. As seen in FIG. 7, a clear pulse 16*a* similar to the clear pulses illustrated in the first and second pulse programs of FIGS. 3 and 5 is provided to form a flux pattern illustrated in FIG. 8*a* which is similar to the flux patterns illustrated in FIGS. 4*a* and 6*a*. To write a "0" bit into the magnetic element 10 of the system illustrated in FIG. 1*a*, a negative pulse 18*b* illustrated in FIG. 7 is applied to the first conductor W creating a magnetic field in a direction tending to reverse the flux produced by the clear pulse 16*a* as indicated in FIG. 8*b* by line 46. In order to write a "1" bit into the magnetic element 10, a positive pulse 28*a* from the "1" bit generator 28 of FIG. 1*a* is applied to the second conductor B in the relationship described hereinabove in connection with "1" bit write pulses 18*a* and 28*a*. The resultant flux produced by the pulses 18*b* and 28*a* is indicated in FIG. 8*c* by the line 36*b*. In order to non-destructively read out the memory system, a pulse 20*b* which may be of the same polarity and magnitude as that of the write pulse 18*b* is applied to the first conductor W to produce on the second conductor B an output voltage 40*b* by varying the resultant flux 36 so as to take the form indicated by the dotted line 38*b* in FIG. 8*c* of the drawing. With the clear pulse 16*a* of a polarity which is opposite to that of the read pulse 20*b*, it has been found that the read pulse 20*b* is not limited by energy considerations with respect to the write pulse 18*b* and, therefore, the read pulse 20*b* may have an amplitude which even exceeds that of the amplitude of write pulse 18*b*. However, the energy content of the read pulse 20*b* should not exceed that of the clear pulse 16*a*.

A fourth pulse program is illustrated in FIG. 9 which is also used to operate the system in accordance with the teachings of the present invention. The fourth pulse program is similar to the third pulse program of FIG. 7 except that a negative pulse 28*a'* is applied to the second conductor B for writing a "1" bit instead of the positive pulse 28*a* of FIG. 7. This negative pulse 28*a'* produces a corresponding change in the shape of the flux pattern which provides a flux linkage of the second conductor B as indicated at 36*c* of FIG. 10*c*. When the read pulse 20*b* is applied to the first conductor W, the flux pattern 36*c* is altered so as to appear as the flux pattern indicated by the dotted line 38*c*. Since the direction of the flux linking the second conductor B as indicated in FIG. 10*c* is the reverse of that indicated in FIG. 8*c* the phase or polarity of the output voltage on the second conductor B will be opposite to that of the output pulse 40*b* of FIG. 7 as indicated at 40*c* in FIG. 9. It can be seen that, if desired, a bipolar output signal may be produced by employing bipolar pulses 28*a* and 28*a'* in a manner similar to that described hereinabove in connection with the first and second pulse programs of FIGS. 3 and 5.

It should be understood, of course, that although separate clear, write and read pulse generators 16, 18 and 20 are shown connected to the first conductor W, a single pulse generator employing suitable controls may be substituted therefor. Furthermore, separate means coupled to each of the generators of FIG. 1*a* may be provided to control the timing and duration of each of the pulses applied to the first and second conductors W and B. Whereas in, for example, the first pulse program of FIG. 3, the clear pulse generator and the write pulse generator produce similar pulses one of the two pulse generators 16 and 18 may be eliminated and the function of the eliminated generator taken over by the remaining generator. When a bipolar output is desired both the "1" bit and "0" bit generators 28 and 30 may be utilized. However, where a unipolar output is desired only one of the generators 28 and 30 need be used in the system.

Referring now to FIG. 11, a magnetic memory plane according to this invention, suitable for use in a high speed computer, is schematically illustrated. The memory plane is word organized having a plurality of column conductors W1, W2 and W3 and a plurality of bit row conductors B1, B2 and B3. Associated with and surrounding each word conductor W1, W2 and W3 is a magnetic member 10.1, 10.2 and 10.3. Along the length of each member 10.1, 10.2 and 10.3 the bit row conductors B1, B2 and B3 are disposed so as that each couples a different portion of the material of the members 10.1, 10.2 and 10.3. The word column conductors W1, W2 and W3 have one end connected to ground while the other end is connected to a word selection and drive means 46 capable of providing address selection of a particular word line, W1 W2 or W3 and the pulse generation corresponding to clear, write and read generators 16, 18 and 20 of FIG. 1*a*. The bit row conductors B1, B2 and B3 are connected to a bit selection and drive means 48 through a respective switch 24.1, 24.2 and 24.3 and are further connected to loads 26.1, 26.2 and 26.3 through a respective switch 22.1, 22.2 and 22.3. The means 48 provides the function of bit addressing and pulse generating corresponding to the generators 28 and 30 of FIG. 1*a* while each switch 24.1, 24.2, and 24.3 corresponds to the switch 24 and each switch 22.1, 22.2 and 22.3 corresponds to the switch 22 of FIG. 1*a*. During the write time of the memory cycle, a particular word line W1, W2, or W3 is energized and in partial concurrence therewith and in overlapping time sequence the bit row conductors B1, B2 and B3 are energized only when a binary 1 is to be stored in a particular bit position. For those bit positions of members 10.1, 10.2, and 10.3 in which the corresponding word conductor is not energized, there is no change in remanent flux distribution in the material of the member coupled by the bit conductors B which are energizing for storing a binary 1 in the particular storage position along a selected one of the members 10.1, 10.2, 10.3. For read out, a select conductor W1, W2, W3 is energized by means 46 in accordance with the teachings of the present invention as described hereinabove to apply a word or read field to the particular member 10.1, 10.2 or 10.3 while the switches 22.1, 22.2 and 22.3 and 24.1, 24.2 and 24.3 are conditioned to connect the loads 26.1, 26.2 and 26.3 to the row conductors B.

While the memory system shown in FIG. 1*a* employs the conductor B as both an input conductor and an output conductor by proper operation of the switches 22 and 24, it should be understood that, if desired, another conductor may be provided in the second hole 14 similar to the disposition of the conductor B in manifestation of the output signal, thereby eliminating the necessity of the switches 22 and 24.

With respect to a memory system of the present invention which operated satisfactorily, the member 10 of FIG. 1*a* was made of T–55 material of the type disclosed in U.S. Patent No. 2,950,252 assigned to the assignee of this application. The member 10 had an inside diameter of 0.0616 inch and an outside diameter of 0.123 inch with an over-all length of 0.95 inch. The word field applied to the member 10 during read out was approximately 3.0 ampere turns and this field was applied for approximately 0.42 microsecond. The magnetic field applied to the bit conductor B for writing a "1" bit was 0.080 ampere turns for approximately one microsecond. The time difference between the initiation of the word field and initiation of the bit field was approximately 0.14 microsecond.

It should be understood that the memory of FIG. 11 of the drawing may be mass fabricated by employing a process as disclosed in a co-pending application, Serial No. 206,326, filed June 29, 1962, now Patent Number 3,229,265, in behalf of J. M. Brownlow et al., and assigned to the assignee of this application. Furthermore, in order to insure the production of magnetic elements which provide uniform magnetic characteristics as seen by the bit row conductors B1, B2 and B3 an overlayer of magnetic material may be placed along the length of each magnetic element in the manner described in commonly assigned co-pending application Serial No. 253,467, filed by E. A. Bartkus et al., now Patent Number 3,243,870. It has been also found that when an overlayer is provided it is desirable to use an overlayer made of storage or relatively remanence material while the remainder of the magnetic element is made of only transformer type material. With this latter combination of materials for the magnetic element, an increase in magnetic field for a given word current can be obtained.

While the invention has been particularly shown and described with reference to preferred embodiments, it will be understood by those skilled in the art that the foregoing and other changes in form and details may be made therein without departing from the spirit and scope of the invention.

What is claimed is:

1. A magnetic information storage system comprising:

(a) a magnetic member made of material exhibiting different stable states of flux remanence, (b) first means operative to pass a first current in a given direction through said member for applying a first field thereto placing said member in a first state of flux orientation and distribution to represent a first information value, (c) second means operative to pass a second current through said member directed transverse with respect to said given direction for applying a second field directed transverse with respect to said first field which is of insufficient magnitude to cause an appreciable change in the first state of remanent flux orientation and distribtuion, (d) third means for operating said first and second means to pass said first and second currents concurrently and then to terminate said first current prior to the termination of said second current thereby to establish said member in a second state having a flux orientation similar to that of said first state but a different remanent state of flux distribution relative to said first remanent state of flux distribution to represent a second information value, (e) fourth means operative to pass a third current in said given direction through said member to temporarily alter the flux distribution in said second state without returning said member to said first state, and (f) means for sensing the temporary alteration of the flux distribution in said second state.

2. A magnetic information storage system comprising:

(a) a magnetic member made of material exhibiting different stable states of flux remanence, (b) first means for applying a first magnetic field in a given direction to said member placing said member in a first state of flux orientation and distribution to represent a first information value, (c) second means applying a second magnetic field directed transverse with respect to said first field which is of insufficient magnitude to cause an appreciable change in the first state of remanent flux orientation and distribution, (d) third means for operating said first and second means to produce said first and second magnetic fields concurrently and then to terminate said first field prior to the termination of said second field thereby to establish said member in a second state having a flux orientation similar to that of said first state but of a different remanent state of flux distribution relative to said first remanent state of flux distribution to represent a second information value, (e) fourth means operative to apply a third magnetic field in said given direction through said member to temporarily alter the flux distribution in said second state without returning said member to said first state, and (f) means for sensing the temporary alternation of the flux distribution in said second state.

3. A magnetic information storage device comprising:

(a) a first conductor, (b) a second conductor displaced from and in orthogonal relationship with said first conductor, (c) a magnetic member surrounding said first and second conductors, said member made of material exhibiting different stable states of flux remanence, (d) means for establishing said member in a first stable state of flux remanence, (e) means for energizing both said first and second conductors concurrently and then to terminate the energization of said first conductor prior to that of said second conductor to establish said member in a second stable state having a flux orientation similar to that of said first stable state but a different remanent state of flux distribution with respect to said first stable state whereby an appreciable remanent flux linkage of said second conductor is established, (f) means for altering the flux distribution in said second state without re-establishing said member in said first stable state, and (g) means for sensing the alteration of the flux distribution in said second state.

4. A magnetic information storage device as set forth in claim 3 wherein (a) said means for energizing said first and second conductors includes means for applying a first pulse of given polarity and given energy content to said first conductor, and (b) said flux distribution altering means includes means for applying a second pulse of lower energy content than said given energy content to said first conductor.

5. A magnetic information storage device as set forth in claim 4 wherein said energizing means further includes means for applying a second pulse of said given polarity but lower energy content than said given energy content to said second conductor.

6. A magnetic information storage device as set forth in claim 4 wherein said energizing means further includes means for applying a second pulse of a polarity opposite to said given polarity and of lower energy content than said given energy content to said second conductor.

7. A magnetic information storage device as set forth in claim 4 wherein said first stable state establishing means includes means for applying a third pulse of a polarity opposite to that of said given polarity.

8. A magnetic information storage device as set forth in claim 7 wherein the energy content of said third pulse is less than that of said given energy content.

9. A magnetic information storage device as set forth in claim 8 wherein the energy content of said third pulse is greater than that of said given energy content.

10. A magnetic information storage device as set forth in claim 3 wherein (a) said first stable state establishing means includes means for applying a first pulse of a given polarity and given energy content to said first conductor, (b) said energizing means includes means for applying a second pulse of opposite polarity to that of said given polarity and of lower energy content than said given energy content to said first conductor, and (c) said flux distribution altering means includes means for applying a third pulse of said opposite polarity and of lower energy content than said given energy content to said first conductor.

References Cited by the Examiner

UNITED STATES PATENTS

| | | | |
|---|---|---|---|
| 3,134,096 | 5/1964 | Bartkus et al. | 340—174 |
| 3,142,048 | 7/1964 | Smith | 340—174 |
| 3,189,879 | 6/1965 | Mac Intyre et al. | 340—174 |
| 3,243,870 | 4/1966 | Bartkus et al. | 29—155.5 |

BERNARD KONICK, *Primary Examiner.*

S. URYNOWICZ, *Assistant Examiner.*